United States Patent [19]

Denzel et al.

[11] 3,903,096
[45] Sept. 2, 1975

[54] NEW DERIVATIVES OF SULFONYL-, SULFINYL- AND SULFENYL-1H-PYRAZOLO[3,4-B]-PYRIDINES

[75] Inventors: Theodor Denzel, Regensburg; Hans Hoehn, Tegernheim, both of Germany

[73] Assignee: E. R. Squibb & Sons, Inc., Princeton, N.J.

[22] Filed: Mar. 29, 1974

[21] Appl. No.: 456,118

[52] U.S. Cl......... 260/294.8 G; 424/263; 260/310 R
[51] Int. Cl.².................................. C07D 231/00
[58] Field of Search.................. 260/294.8 G

[56] References Cited
UNITED STATES PATENTS
3,847,929  11/1974  Denzel et al................. 260/296 H OTHER PUBLICATIONS
Chemical Abstracts, Vol. 67, abst. no. 116403 w(1967), (abst. of Troitskaya et al.).
Korbukh et al., Zhur. Org. Khim. Vol. 9, pp. 1266–1272, (June 1973), (English equivalent, pp. 1294 to 1300 furnished).

Primary Examiner—John D. Randolph
Attorney, Agent, or Firm—Lawrence S. Levinson; Merle J. Smith

[57] ABSTRACT

The new derivatives of sulfonyl-, sulfinyl- and sulfenyl-pyrazolo[3,4-b]pyridines have the general formula

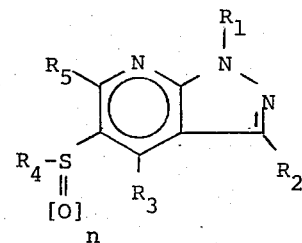

The novel compounds are useful as central nervous system depressants, antiinflammatory and diuretic agents. In addition, the new compounds increase the intracellular concentration of adenosine-3',5'-cyclic monophosphate.

14 Claims, No Drawings

NEW DERIVATIVES OF SULFONYL-, SULFINYL- AND SULFENYL-1H-PYRAZOLO [3,4-B]-PYRIDINES

SUMMARY OF THE INVENTION

This invention relates to new sulfonyl-, sulfinyl- and sulfenyl derivatives of 1H-pyrazolo[3,4-b]pyridines, and salts of these compounds. These new compounds have the formula (I)
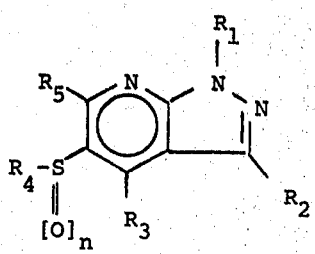

$R_1$ is hydrogen, lower alkyl, phenyl, phenyl-lower alkyl or furfuryl.
$R_2$ is hydrogen, lower alkyl or phenyl.
$R_3$ is hydroxy, lower alkoxy or a basic nitrogen group

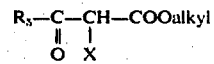

The latter group represents an acrylic amino group wherein
$R_6$ and $R_7$ each is hydrogen or lower alkyl.
$R_4$ is lower alkyl or phenyl.
$R_5$ is hydrogen, lower alkyl or phenyl.
$n$ is 0, 1 or 2.

DETAILED DESCRIPTION OF THE INVENTION

The lower alkyl groups referred to throughout the specification include straight or branched chain hydrocarbon groups containing 1 to 7 carbon atoms. Examples of the type of group contemplated are methyl, ethyl, propyl, isopropyl, butyl, t-butyl, etc. The lower alkoxy groups include the same moieties. Preferred are the 1 to 4 carbon groups, especially 1 to 2 carbon members.

Preferred embodiments of this invention are as follows:
$R_1$ is hydrogen or lower alkyl, most preferably hydrogen or ethyl.
$R_2$ is hydrogen or lower alkyl, most preferably hydrogen or methyl.
$R_3$ is hydroxy or lower alkoxy, most preferably ethoxy, or a basic moiety with the substituents $R_6$ and $R_7$ representing hydrogen or lower alkyl, most preferably both $R_6$ and $R_7$ are hydrogen or $R_6$ is hydrogen and $R_7$ forms lower alkylamino, especially butylamino or sec. butylamino.
$R_4$ is lower alkyl, preferably methyl, or phenyl.
$R_5$ is hydrogen or lower alkyl, most preferably methyl.
$n$ is 0, 1 or 2.

The new compounds of formula I are produced by the following methods.
A 5-aminopyrazole of the formula

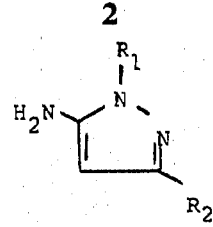

prepared according to the procedure described in Z. f. Chemie 10, 386–388 (1970) is made to react with a haloacetoacetic acid ester of the formula (III)        $R_5-\underset{\underset{O}{\|}}{C}-\underset{\underset{X}{|}}{CH}-COO\text{alkyl}$ (wherein $R_5$ is other than hydrogen and X is chlorine or bromine) by heating at a temperature of about 80°–90° C, while distilling off the water formed by means of an appropriate solvent like benzene.
The resulting compound of the formula (IV)

is treated with an alkali metal mercaptide or an alkali metal salt of a sulfinic acid to give a compound of the formula (V)

wherein $n$ is 0 or 2.
When $R_5$ is hydrogen the 5-aminopyrazole of formula II is made to react with an acrylic acid derivative of the formula (VI) 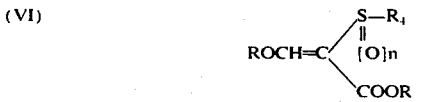

wherein R is lower alkyl.
Compounds of formula V wherein $n$ is 0, 1 or 2 may alternatively be produced by reaction of a compound of the formula (IVa) 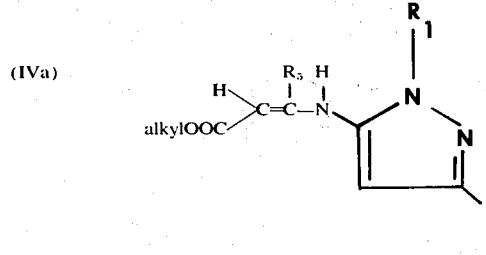

with the appropriate sulfenic, sulfinic or sulfonic acid halide, e.g., $$R_1-\overset{[O]_n}{\underset{\|}{S}}-X,$$

wherein x is a halogen, preferably chlorine, in the presence of a strong base like sodium hydride.

This compound is now cyclized by heating in a high boiling solvent like diphenyl ether, or without any solvent, at a temperature of about 240°–250°C. while distilling off the alcohol formed. This procedure yields a compound of the formula (Ia)

A compound of the formula (Ib)

is now produced by alkylating the product of formula Ia with an appropriate lower alkyl halide in the presence of an inorganic base like potassium carbonate in a solvent like dimethylformamide.

Compounds of formula Ib are alternatively produced by halogenating compounds of formula Ia with an acid chloride like phosphorous oxychloride to produce a compound of the formula (Ic)

A product of formula Ib is then produced by reacting the compound of formula Ic with an alkali metal alcoholate.

Compounds of the formula (Id)

with an amino group in the 4-position are produced by reacting either a compound of formula Ib or formula Ic with the amine of the formula (VII)    $HN\diagdown{R_7}^{R_6}$ wherein $R_6$ and $R_7$ are the same as previously described. Sometimes it is advantageous to make use of an autoclave.

Compounds of formula Ia, b and c in which n is 1 are produced by oxidizing a product of formula Ia, b or c in which n is 0 with an oxidizing agent like sodium periodate, a hydroperoxide, potassium permanganate, selenium dioxide or the like. Compounds of formula Id in which n is 1 are produced by reacting compounds of formula Ib and Ic (with n = 1) with an amine as previously described.

According to a modification of the foregoing procedure, a product of formula I wherein $R_1$ is hydrogen is produced. By this modification, a 5-aminopyrazole of formula II, wherein $R_1$ is a heteromethyl group, is used. This starting material has the formula (IIa)

wherein $R_8$ is a heterocyclic like furyl, which is preferred, pyridyl, pyrimidyl or the like.

This material is processed as described above through the reaction with the ester of formula III to obtain a compound of formula IV.

Reaction with the mercaptide or sulfinic acid salt gives a compound of formula V. Cyclization of this product yields a compound of formula I*a*.

Alkylating with the alkyl halide gives a compound of formula I*b* with the —CH$_2$—R$_8$ substituent in the 1-position.

At this point, the compound of formula I*b* having the R$_8$—CH$_2$ substituent in the 1-position is oxidized with an oxidizing agent like selenium dioxide in a high boiling solvent like diethylene glycol dimethyl ether at about 160°C. yielding the compound of the formula (Id)

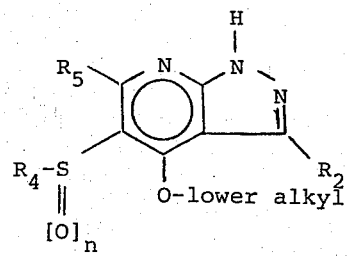

wherein R$_1$ is hydrogen. This type of compound is a suitable one to be converted to derivatives carrying a substituent in the 4-position wherein R$_3$ is other than lower alkoxy.

The compounds of formula I form salts which are also part of this invention. The salts include acid-addition salts, particularly the non-toxic, physiologically acceptable ones. The bases of Formula I form acid addition salts by reaction with a variety of inorganic and organic acids. Examples of acid addition salts are the hydrohalides (especially the hydrochloride), sulfate, nitrate, phosphate, oxalate, tartrate, malate, citrate, acetate, ascorbate, succinate, benzenesulfonate, toluenesulfonate, cyclohexanesulfonate, etc. The acid-addition salts frequently provide a convenient means for isolating the product, e.g., by forming and precipitating the salt in an appropriate menstruum in which the salt is insoluble, then after separation of the salt, neutralizing with a base such as barium hydroxide or sodium hydroxide, to obtain the free base of formula I. Other salts are then formed from the free base by reaction with an equivalent of the appropriate acid.

The novel compounds of this invention are central nervous system depressants, and are useful as ataractic agents. They find further utility as antiinflammatory agents. They can be used, for example, in mice, cats, rats, dogs and other mammals. For this purpose, a compound or mixture of compounds of formula I, or non-toxic, physiologically acceptable acid addition salt thereof, is administered orally or parenterally in a conventional dosage form such as tablet, capsule, injectable or the like. A single dose, or preferably 2 to 4 divided doses, may be provided on a basis of about 1 to 50 milligrams per kilogram per day, preferably about 2 to 15 mg/kg/day. These are conventionally formulated in an oral or parenteral dosage form by compounding about 10 to 25 milligrams per unit of dosage with conventional vehicle, excipient, binder, preservative, stabilizer, flavor or the like as called for by accepted pharmaceutical practice. As antiinflammatory agents they can be used topically by formulating a conventional topical composition such as a cream or lotion containing the active substance in a concentration of about 0.1 to 0.3 percent by weight.

The new compounds also increase the intracellular concentration of adenosine-3',5'-cyclic monophosphate. The use of about 1 to 25 mg/kg/day in a conventional dosage form as described above alleviates the symptoms of asthma.

The following examples are specific embodiments of the invention. All temperatures are recorded on the centigrade scale.

EXAMPLE 1 a. 2-Chloro-3-[(1-ethyl-5-pyrazolyl)amino]crotonic acid, ethyl ester 111 g. of 5-Amino-1-ethylpyrazole (1Mol.) and 164 g. of α-chloroacetoacetic acid ethyl ester are heated in 600 ml. of benzene at reflux temperature. The water formed is removed continuously by means of a water separator. Heating is continued until the theoretical amount of water has been formed (approximately 10 hours). After this time, the benzene layer is decanted from the viscous oil and evaporated to dryness. The oily residue is recrystallized from diethyl ether yielding 164 g. of 2-chloro-3-[(1-ethyl-5-pyrazolyl)amino]-crotonic acid ethyl ester, m.p. 42°–44°.

b. 3-[(1-ethyl-5-pyrazolyl)amino]-2-(phenylsulfonyl)crotonic acid ethyl ester 275 g. of 2-chloro-3-[(1-ethyl-5-pyrazolyl)amino]-crotonic acid ethyl ester (1mol.) are dissolved in 1 liter of anhydrous dioxane and refluxed with stirring with 164 g. of sodium phenylsulfonate for 24 hours. After this time, the mixture is evaporated to dryness, the oily residue is dissolved in about 1 liter of ether and filtered. The ethereal solution is evaporated to dryness. The resulting product, 3-[(1-ethyl-5-pyrazolyl)amino]-2-(phenylsulfonyl)crotonic acid ethyl ester, is obtained as an oil which is used without further purification.

c. 1-Ethyl-4-hydroxy-6-methyl-5-phenylsulfonyl-1H-pyrazolo[3,4-b]pyridine 36.3 g. of [(1-ethyl-5-pyrazolyl)amino]-2-(phenylsulfonyl)crotonic acid ethyl ester (0.1 Mol) are treated in an oil bath at 240°–245° until no more alcohol distills off. (about 10 min.) The solution is cooled to room temperature and 50 ml. of methanol are added. The product, 1-ethyl-4-hydroxy-6-methyl-5-phenylsulfonyl-1H-pyrazolo[3,4-b]pyridine crystallizes, is filtered and recrystallized from butanol, yield 18.1 g. (57%), m.p. 280°–281°.

EXAMPLE 2

1-Ethyl-4-ethoxy-6-methyl-5-phenylsulfonyl-1H-pyrazolo[3,4-b]pyridine 15.9 g. of 1-ethyl-4-hydroxy-6-methyl-5-phenylsulfonyl-1H-pyrazolo[3,4-b]pyridine (0.05 Mol) are dissolved in 50 ml. of dimethylformamide. 13.8 g. of potassium carbonate (0.1 Mol) and 10 g. of ethyl iodide are added. The mixture is stirred at 60° for 10 hours. The precipitate is filtered and about 10 ml. of water are added to the filtrate. 1-Ethyl-4-ethoxy-6-methyl-5-phenylsulfonyl-1H-pyrazolo[3,4-b]pyridine precipitates, is filtered and recrystallized from methanol, yield 15.5 g. (87%), m.p. 172°–174°.

EXAMPLE 3

4-Butylamino-1-ethyl-6-methyl-5-phenylsulfonyl-1H-pyrazolo[3,4-b]pyridine 8.8 g. of 1-ethyl-4-ethoxy-6-methyl-5-phenylsulfonyl-1H-pyrazolo[3,4-b]pyridine and 20 ml. of n-butylamine are refluxed for 12 hours.

After this period the excess butylamine is removed in vacuo and the residual 4-n-butylamino-1-ethyl-6-methyl-5-phenylsulfonyl-1H-pyrazolo[3,4-b]pyridine is recrystallized from ethylacetate, yield 8 g. (86%), m.p. 112°–114°. Treatment of this product with 1N hydrochloric acid in ethanol yields the hydrochloride salt.

4-Butylamino-1-furfuryl-6-methyl-5-phenylsulfonyl-1H-pyrazolo[3,4-b]pyridine, m.p. 105°–107°, is produced by the above procedure by substituting 1-furfuryl-4-ethoxy-6-methyl-5-phenylsulfonyl-1H-pyrazolo[3,4-b]pyridine as the starting material.

EXAMPLE 4 a.

3-[(1-Ethyl-5-pyrazolyl)amino]-2-(phenylthio)crotonic acid ethyl ester 257 g. of 2-chloro-3-[(1-ethyl-5-pyrazolyl)amino]-crotonic acid ethyl ester (1Mol) and 132 g. of sodium thiophenolate are refluxed in 1 liter of anhydrous dioxane for 12 hours with stirring. The mixture is evaporated to dryness, the residue is dissolved in 500 ml. of ether and filtered. The filtrate is cooled to about −20° to −30° whereupon 3-[(1-ethyl-5-pyrazolyl)amino]-2-(phenylthio)crotonic acid, ethyl ester precipitates. The product is purified by recrystallization from petroleum ether, yield 270 g. (81%), m.p. 36°–37°.

b.

1-Ethyl-4-hydroxy-6-methyl-5-phenylsulfenyl-1H-pyrazolo[3,4-b]pyridine 33.1 g. of 3-[(1-ethyl-5-pyrazolyl)amino]-2-(phenylthio)crotonic acid, ethyl ester (0.1 Mol) are heated in an oil bath at 240°–245° until the evolution of alcohol ceases (about 5 min.). The residue is cooled to room temperature, 50 ml. of methanol are added and the precipitate is filtered. Recrystallization from butanol yields 18.4 g. (55%) of 1-ethyl-4-hydroxy-6-methyl-5-phenylsulfenyl-1H-pyrazolo[3,4-b]pyridine, m.p. 263°–264°.

1-Furfuryl-4-hydroxy-6-methyl-5-methylsulfenyl-1H-pyrazolo[3,4-b]pyridine, m.p. 203°–205°, is produced by the above procedure by substituting 3-[(1-furfuryl-5-pyrazolyl)amino]-2-methylthiocrotonic acid ethyl ester as starting material.

EXAMPLE 5

1-Ethyl-4-ethoxy-6-methyl-5-phenylsulfenyl-1H-pyrazolo[3,4-b]pyridine 3.3 g. of 1-Ethyl-4-hydroxy-6-methyl-5-phenylsulfenyl-1H-pyrazolo[3,4-b]pyridine (0.01 Mol), 2.8 g. of potassium carbonate (0.02 Mol) and 3.1 g. of ethyl iodide (0.02 Mol) are heated at 60°–70° in 20 ml. of dimethylformamide for 10 hours with continuous stirring. The precipitate is filtered off and the filtrate is treated with 5 ml. of water. 1-Ethyl-4-ethoxy-6-methyl-5-phenylsulfenyl-1H-pyrazolo[3,4-b]pyridine precipitates and is recrystallized from ethyl acetate, yield 2.5 g. (80%), m.p. 86°–87°.

4-Ethoxy-1-furfuryl-6-methyl-5-methylsulfenyl-1H-pyrazolo[3,4-b]pyridine, m.p. 101°–103°, is produced by the foregoing procedure from the product in Example 4b.

EXAMPLE 6

1-Ethyl-4-ethoxy-6-methyl-5-phenylsulfinyl-1H-pyrazolo[3,4-b]pyridine 3.1 g. of 1-ethyl-4-ethoxy-6-methyl-5-phenylsulfenyl-1H-pyrazolo[3,4-b]pyridine, 2.1 g. of sodium periodide, 20 ml. of methanol and 5 ml. of water are heated at 40°–45° for 12 hours. The mixture is evaporated to dryness, the residue treated with 10 ml. of water and extracted three times with 20 ml. portions of chloroform. The extract is dried over sodium sulfate, the solvent is distilled off and the crystalline residue is recrystallized from methanol to obtain 1-ethyl-4-ethoxy-6-methyl-5-phenylsulfinyl-1H-pyrazolo[3,4-b]pyridine, yield 2.8 g. (85%), m.p. 136°–138°.

4-Ethoxy-1-furfuryl-6-methyl-5-phenylsulfinyl-1H-pyrazolo[3,4-b]pyridine, m.p. 154°–155°, is produced by the above procedure by substituting 4-ethoxy-1-furfuryl-6-methyl-5-phenylsulfenyl-1H-pyrazolo[3,4-b]pyridine as the starting material.

4-Ethoxy-1-ethyl-6-methyl-5-methylsulfinyl-1H-pyrazolo[3,4-b]pyridine, m.p. 117°–120°, is produced by the foregoing procedure by substituting 4-ethoxy-1-ethyl-6-methyl-5-methylsulfenyl-1H-pyrazolo[3,4-b]pyridine as starting material.

EXAMPLE 7

4-Amino-1-ethyl-6-methyl-5-phenylsulfinyl-1H-pyrazolo[3,4-b]pyridine 3.3 g. of 1-ethyl-4-ethoxy-6-methyl-5-phenylsulfinyl-1H-pyrazolo[3,4-b]pyridine (0.01 Mol) are dissolved in 50 ml. of butanol. 50 ml. of concentrated aqueous ammonia are added and the mixture is heated for 20 hours at 180° in an autoclave. The solvent is removed in vacuo and the residue is recrystallized from a dimethylformamide-water mixture to obtain 4-amino-1-ethyl-6-methyl-5-phenylsulfinyl-1H-pyrazolo[3,4-b]pyridine, yield 17 g. (63%), m.p. 248°–250°.

4-Amino-1-ethyl-6-methyl-5-phenylsulfonyl-1H-pyrazolo[3,4-b]pyridine, m.p. 184°–186°, is produced by the foregoing procedure by substituting 1-ethyl-4-ethoxy-6-methyl-5-phenylsulfonyl-1H-pyrazolo[3,4-b]pyridine as the starting material.

4-Butylamino-1-ethyl-6-methyl-5-phenylsulfinyl-1H-pyrazolo[3,4-b]pyridine, m.p. 99°–102°, is produced by the foregoing procedure by substituting 1-ethyl-4-ethoxy-6-methyl-5-phenylsulfinyl-1H-pyrazolo[3,4-b]pyridine as the starting material.

4-Amino-1-ethyl-6-methyl-5-methylsulfinyl-1H-pyrazolo[3,4-b]pyridine, m.p. 176°–180°, is produced by the foregoing procedure by substituting 1-ethyl-4-ethoxy-6-methyl-5-methylsulfinyl-1H-pyrazolo[3,4-b[pyridine as the starting material.

EXAMPLE 8 a.

3-[(1-Ethyl-5-pyrazolyl)amino]-2-methylthiocrotonic acid, ethyl ester 257 g. of 2-chloro-3-[(1-ethyl-5-pyrazolyl)amino]-crotonic acid ethyl ester (1 Mol) and 70 g. of sodium ethyl mercaptide are refluxed for 12 hours in 1 liter of anhydrous dioxane with stirring. After this time, the mixture is evaporated to dryness, the oily residue is dissolved in about 1 liter of ether and filtered. The solvent is removed in vacuo and the resulting product, 3-[(1-ethyl-5-pyrazolyl)amino]-2-methylthiocrotonic acid, ethyl ester, is obtained as an oil which is used without further purification.

b.
1-Ethyl-4-hydroxy-6-methyl-5-methylthio-1H-pyrazolo[3,4-b]pyridine

The oily product from part a is heated in an oil bath at 230°–240° for about 15 minutes. After this time, the mixture is cooled and about 300 ml. of methanol are added. 1-Ethyl-4-hydroxy-6-methyl-5-methylthio-1H-pyrazolo[3,4-b]pyridine crystallizes and is purified by recrystallization from butanol, yield 85 g., m.p. 253°–255°.

EXAMPLE 9

1-Ethyl-4-ethoxy-6-methyl-5-methylthio-1H-pyrazolo[3,4-b]pyridine 22.3 g. of 1-ethyl-4-hydroxy-6-methyl-5-methylthio-1H-pyrazolo[3,4-b]pyridine (0.1 Mol), 20.7 g. of potassium carbonate (0.15 Mol) and 23.2 g. of ethyl iodide (0.15 Mol) are heated with stirring at 60° for 10 hours in 100 ml. of dimethylformamide. The inorganic precipitate is filtered off and the filtrate is treated with 30 ml. of water. Recrystallization of the crystalline product from ethyl acetate yields 19.8 g. (79%) of pure 1-ethyl-4-ethoxy-6-methyl-5-methylthio-1H-pyrazolo[3,4-b]pyridine, m.p. 63°–64°.

4-Ethoxy-6-methyl-5-phenylthio-1H-pyrazolo[3,4-b]pyridine, m.p. 244°–246°, is produced by the above procedure by substituting 4-hydroxy-6-methyl-5-phenylthio-1H-pyrazolo[3,4-b]pyridine as the starting material.

EXAMPLE 10 a. 2-Chloro-3-[(1-furfuryl-5-pyrazolyl)amino]crotonic acid ethyl ester 163 g. of 5-amino-1-furfurylpyrazole (1 Mol) and 164 g. of α-chloroaceto acetic acid ethyl ester are heated in 600 ml. of benzene at reflux temperature. The water formed is continuously removed by means of a water separator. When the theoretical amount of water is distilled off, the benzene layer is decanted from the viscous oil at the bottom of the flask. The benzene is evaporated in vacuo and the residue is recrystallized from diethyl ether yielding 225 g. of 2-chloro-3-[(1-furfuryl-5-pyrazolyl)amino]crotonic acid ethyl ester (73%), m.p. 36°–38°.

b.
3-[(1-Furfuryl-5-pyrazolyl)amino]-2-phenylsulfonylcrotonic acid ethyl ester 309 g. of 2-chloro-3-[(1-furfuryl-5-pyrazolyl)amino]crotonic acid ethyl ester (1 Mol) and 164 g. of sodium phenylsulfonate are refluxed for 24 hours in 1 liter of anhydrous dioxane. The solvent is removed in vacuo and the residue is dissolved in about 1 liter of ether. The inorganic precipitate is filtered off and the filtrate cooled to about −20° to −30°. 3-[(1-furfuryl-5-pyrazolyl)amino]-2-phenylsulfonylcrotonic acid ethyl ester crystallizes and is filtered off, yield 345 g. (83%), m.p. 81°–82°.

3-[(1-furfuryl-5-pyrazolyl)amino]-2-phenylsulfonylacrylic acid ethyl ester (m.p. 123°–125°) is similarly produced from 5-amino-1-furfurylpyrazole and 3-ethoxy-2-phenylsulfonylacrylic acid ethyl ester.

c.
1-Furfuryl-4-hydroxy-6-methyl-5-phenylsulfonyl-1H-pyrazolo[3,4-b]pyridine 208 g. of [(1-furfuryl-5-pyrazolyl)amino]-2-phenylsulfonylcrotonic acid ethyl ester (0.5 Mol) are heated at 240°–245° while distilling off the alcohol formed. After cooling to room temperature, 200 ml. of methanol are added. 1-Furfuryl-4-hydroxy-6-methyl-5-phenylsulfonyl-1H-pyrazolo[3,4-b]pyridine crystallizes and is filtered and recrystallized from butanol, yield 95 g. (51%), m.p. 187°–189°.

1-Furfuryl-4-hydroxy-6-methyl-5-phenylthio-1H-pyrazolo[3,4-b]pyridine, m.p. 220°–221°, is produced by the foregoing procedure by substituting 3-[(1-furfuryl-5-pyrazolyl)amino]-2-phenylthiocrotonic acid ethyl ester as the starting material.

EXAMPLE 11

1-Furfuryl-4-ethoxy-6-methyl-5-phenylsulfonyl-1H-pyrazolo[3,4-b]pyridine 36.9 g. of 1-furfuryl-4-hydroxy-6-methyl-5-phenylsulfonyl-1H-pyrazolo[3,4-b]pyridine (0.1 Mol), 20.7 g. of potassium carbonate, 23.2 g. of ethyl iodide (0.15 Mol) are heated with stirring in 100 ml. of dimethylformamide for 20 hours at 60°. The mixture is filtered hot and 10 ml. of water are added. 1-Furfuryl-4-ethoxy-6-methyl-5-phenylsulfonyl-1H-pyrazolo[3,4-b]pyridine crystallizes, yield 30 g. (70%), m.p. 177°–179° (butanol).

4-Ethoxy-1-furfuryl-6-methyl-5-phenylthio-1H-pyrazolo[3,4-b]pyridine, m.p. 109°–111°, is produced by the above procedure by substituting 1-furfuryl-4-hydroxy-6-methyl-5-phenylthio-1H-pyrazolo[3,4-b]pyridine as the starting material.

EXAMPLE 12

4-Ethoxy-6-methyl-5-phenylsulfonyl-1H-pyrazolo[3,4-b]pyridine 3.9 g. of 1-furfuryl-4-ethoxy-6-methyl-5-phenylsulfonyl-1H-pyrazolo[3,4-b]pyridine (0.1 Mol) and 1.2 g. of selenium dioxide (0.011 Mol) are refluxed in diglyme for 2 hours. The selenium is filtered off and the filtrate evaporated to dryness. On addition of 10 ml. of ether, 4-ethoxy-6-methyl-5-phenylsulfonyl-1H-pyrazolo[3,4-b]pyridine crystallizes, yield 2.0 g. (63%), m.p. 264°–266° (butanol).

EXAMPLE 13

4-Amino-6-methyl-5-phenylsulfonyl-1H-pyrazolo[3,4-b]pyridine 3.2 g. of 4-ethoxy-6-methyl-5-phenylsulfonyl-1H-pyrazolo[3.4-b]pyridine (0.01 Mol), 100 ml. of concentrated aqueous ammonia and 20 ml. of butanol are heated in an autoclave for 10 hours at 170°. The resulting mixture is evaporated to dryness and the residue is recrystallized from butanol to obtain 4-amino-6-methyl-5-phenylsulfonyl-1H-pyrazolo[3,4-b]pyridine, yield 1.9 g (63%), m.p. 248°–250°.

EXAMPLE 14 a. 3-(1-Ethylpyrazolyl-5-amino)crotonic acid ethyl ester 111 g. of 1-Ethyl-5-aminopyrazole (1 Mol), 130 g. of acetoacetic acid ethyl ester and 1 g. of p-toluene sulfonic acid are refluxed in 1 liter of benzene. The water formed is removed by a water separator. After 2 hours, the reaction is finished and the solvent is distilled off. The oily residue is dissolved in about 500 ml. ether. 3-(1-ethylpyrazolyl-5-amino)crotonic acid ethyl ester solidifies on cooling, yield 200 g. (89%), m.p. 75°–76°.

b. 1-Ethyl-4-hydroxy-6-methyl-5-methylsulfonyl-1H-pyrazolo[3,4-b]pyridine 111.5 g of 3-(1-Ethylpyrazolyl-5-amino)crotonic ethyl ester (0.5 Mol) is added to a suspension of 26.4 g. of sodium hydride (0.55 Mol) in 1 liter of anhydrous dioxane. The mixture is kept at 60° for 15 minutes with stirring. After this time, 57 g. of methanesulfonic acid chloride is added dropwise. Refluxing is continued for 24 hours. -Ethylpyrazolyl-solvent is distilled off and the resulting oil carefully acidified with acetic acid. Water is added and the oil extracted 3 times with 200 ml. portions of chloroform. Drying and evaporation of the solvent yields crude 3-(1-ethylpyrazolyl-5-amino)-2-methylsulfonyl crotonic acid ethyl ester which is heated in an oil bath at 240° until no more alcohol distils off. After cooling to room temperature, 200 ml. of methanol are added. The product, 1-ethyl-4-hydroxy-6-methyl-5-methylsulfonyl-1H-pyrazolo[3,4-b]pyridine, is recrystallized from butanol, yield 55 g. (43%), m.p. 226°–227°.

EXAMPLE 15

1-Ethyl-4-ethoxy-6-methyl-5-methylsulfonyl-1H-pyrazolo[3,4-b]pyridine 25.5 g. of 1-Ethyl-4-hydroxy-6-methyl-5-methylsulfonyl-1H-pyrazolo[3,4-b]pyridine (0.1 Mol), 20.7 g. of potassium carbonate (0.15 Mol) and 23.2 g. of ethyl iodide (0.15 Mol) are heated in 100 ml. of dimethylformamide for 10 hours with stirring. The inorganic precipitate is filtered hot and about 30 ml. of water are added. The product, 1-ethyl-4-ethoxy-6-methyl-5-methylsulfonyl-1H-pyrazolo[3,4-b]pyridine precipitates and is purified by recrystallization from alcohol, yield 22.5 g. (79%).

EXAMPLE 16

4-sec.Butylamino-1-ethyl-6-methyl-5-methylsulfonyl-1H-pyrazolo[3,4-b]pyridine 2.8 g. of 1-Ethyl-4-ethoxy-6-methyl-5-methylsulfonyl-1H-pyrazolo[3,4-b]pyridine (0.01 Mol) and 50 ml. of sec. butylamine are refluxed for 24 hours. After this time, the excess sec. butylamine is removed in vacuo and the residue is recrystallized from methanol to obtain 4-sec.butylamino-1-ethyl-6-methyl-5-methylsulfonyl-1H-pyrazolo[3,4-b]pyridine, yield 2.5 g. (79%), m.p. 139°–140°.

EXAMPLE 17

4-Hydroxy-1,3,6-trimethyl-5-phenylsulfonyl-1H-pyrazolo[3,4-b]pyridine

By following the procedure of Example 1 but substituting 5-amino-1,3-dimethylpyrazole as the starting material in part (a), 4-hydroxy-1,3,6-trimethyl-5-phenylsulfonyl-1H-pyrazolo[3,4-b]pyridine is obtained.

EXAMPLE 18

4-Propoxy-1,3,6-trimethyl-5-phenylsulfonyl-1H-pyrazolo[3,4-b]pyridine

By following the procedure of Example 2 using the product of Example 17 and propyl iodide instead of ethyl iodide, 4-propoxy-1,3,6-trimethyl-5-phenylsulfonyl-1H-pyrazolo[3,4-b]pyridine is obtained.

EXAMPLE 19

4-Diethylamino-1-ethyl-6-methyl-5-methylsulfonyl-1H-pyrazolo[3,4-b]pyridine

By following the procedure of Example 16 but substituting diethylamine for the sec.butylamine, 4-diethylamino-1-ethyl6-methyl-5-methylsulfonyl-1H-pyrazolo[3,4-b]pyridine is obtained.

EXAMPLE 20

4-Methylamino-1-ethyl-6-methyl-5-phenylsulfinyl-1H-pyrazolo[3,4-b]pyridine

By following the procedure of Example 7 but substituting methylamine for ammonia, 4-methylamino-1-ethyl-6-methyl-5-phenylsulfinyl-1H-pyrazolo[3,4-b]pyridine is obtained.

EXAMPLE 21

4-Amino-6-methyl-3-phenyl-5-phenylsulfonyl-1H-pyrazolo[3,4-b]pyridine

By substituting 5-amino-1-furfuryl-3-phenylpyrazole for the 5-amino-1-furfurylpyrazole in part (a) of Example 10, and proceeding as in parts (b) and (c) of that example and also proceeding as in Examples 11, 12 and 13, the 3-phenyl analogs of each of the products is obtained, with 4-amino-6-methyl-3-phenyl-5-phenylsulfonyl-1H-pyrazolo[3,4-b]pyridine as the final product.

EXAMPLE 22

1,6-Diethyl-4-ethoxy-5-phenylsulfonyl-1H-pyrazolo[3,4-b]pyridine

By substituting 2-chloro-3-oxopentanoic acid ethyl ester for the α-chloro-acetoacetic acid ethyl ester in part (a) of Example 1 and proceeding through parts (b) and (c) and Example 2, 1,6-diethyl-4-ethoxy-5-phenylsulfonyl-1H-pyrazolo[3,4-b]pyridine is obtained.

EXAMPLE 23

4-Hydroxy-6-methyl-1-propyl-5-methylsulfonyl-1H-pyrazolo[3,4-b]pyridine

By substituting 5-amino-1-propylpyrazole as the starting material in part (a) of Example 14, 4-hydroxy-6-methyl-1-propyl-5-methylsulfonyl-1H-pyrazolo[3,4-b]pyridine is obtained.

EXAMPLE 24

1,3-Diethyl-4-hydroxy-6-methyl-5-phenylsulfonyl-1H-pyrazolo[3,4-b]pyridine

By substituting 5-amino-1,3-diethylpyrazole as the starting material in part (a) of Example 1, 1,3-diethyl- 4-hydroxy-6-methyl-5-phenylsulfonyl-1H-pyrazolo[3,4-b]pyridine is obtained.

EXAMPLE 25

1-Phenyl-4-hydroxy-6-methyl-5-phenylsulfenyl-1H-pyrazolo[3,4-b]pyridine

By substituting 2-chloro-3-[(1-phenyl-5-pyrazolyl)amino]crotonic acid ethyl ester for the starting material in part (a) of Example 4, 1-phenyl-4-hydroxy-6-methyl-5-phenylsulfenyl-1H-pyrazolo-[3,4-b]pyridine is obtained.

EXAMPLE 26

4-Amino-6-methyl-1-phenyl-5-phenylsulfinyl-1H-pyrazolo[3,4-b]pyridine

By utilizing the product of Example 25 and following the procedures of Examples 5, 6 and 7, 4-amino-6-methyl-1-phenyl-5-phenylsulfinyl-1H-pyrazolo[3,4-b]pyridine is obtained.

EXAMPLE 27

1-Benzyl-4-hydroxy-6-methyl-5-phenylsulfonyl-1H-pyrazolo[3,4-b]pyridine

By substituting 5-amino-1-benzylpyrazole for the starting material in part (a) of Example 1, 1-benzyl-4-hydroxy-6-methyl-5-phenylsulfonyl-1H-pyrazolo[3,4-b]pyridine is obtained.

EXAMPLE 28

1-Benzyl-4-dimethylamino-6-methyl-5-phenylsulfonyl-1H-pyrazole[3,4-b]pyridine

By utilizing the product of Example 27 in the procedures of Examples 2 and 3 and substituting dimethylamine for the n-butylamine, 1-benzyl-4-dimethylamino-6-methyl-5-phenylsulfonyl-1H-pyrazolo[3,4-b]pyridine is obtained.

EXAMPLE 29

4-Butylamino-1-ethyl-6-phenyl-5-phenylsulfonyl-1H-pyrazolo[3,4-b]pyridine

By substituting 2-chloro-2-benzoylacetic acid ethyl ester for the 2-chloroacetoacetic acid ethyl ester in part (a) of Example 1 and following the procedure of that example and Examples 2 and 3, 1-ethyl-4-hydroxy-6-phenyl-5-phenylsulfonyl-1H-pyrazolo[3,4-b]pyridine, 1-ethyl-4-ethoxy-6-phenyl-5-phenylsulfonyl-1H-pyrazolo[3,4-b]pyridine, and 4-butylamino-1-ethyl-6-phenyl-5-phenylsulfonyl-1H-pyrazolo[3,4-b]pyridine, respectively, are obtained.

What is claimed is:

1. A compound of the formula

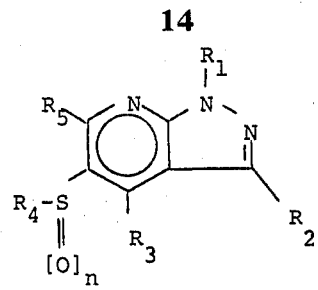

wherein
$R_1$ is hydrogen, lower alkyl, phenyl, benzyl or furfuryl;
$R_2$ is hydrogen, lower alkyl or phenyl;
$R_3$ is hydroxy, lower alkoxy or the group

$R_4$ is lower alkyl or phenyl;
$R_5$ is hydrogen, lower alkyl or phenyl;
$R_6$ and $R_7$ each is hydrogen or lower alkyl; $n$ is 0, 1 or 2;
and physiologically acceptable acid addition salts thereof.

2. A compound as in claim 1 wherein $R_2$ is hydrogen.
3. A compound as in claim 2 wherein $R_3$ is hydroxy.
4. A compound as in claim 2 wherein $R_3$ is lower alkoxy.
5. A compound as in claim 2 wherein $R_3$ is amino.
6. A compound as in claim 2 wherein $R_3$ is lower alkylamino.
7. A compound as in claim 3 wherein $R_1$ and $R_5$ each is lower alkyl, $R_4$ is phenyl and $n$ is 2.
8. A compound as in claim 3 wherein $R_1$ is ethyl and $R_5$ is methyl.
9. A compound as in claim 4 wherein $R_1$ and $R_5$ each is lower alkyl, $R_4$ is phenyl and $n$ is 2.
10. A compound as in claim 9 wherein $R_1$ is ethyl, $R_3$ is ethoxy and $R_5$ is methyl.
11. A compound as in claim 6 wherein $R_1$ and $R_5$ each is lower alkyl, $R_4$ is phenyl and $n$ is 2.
12. A compound as in claim 11 wherein $R_1$ is ethyl and $R_5$ is methyl.
13. A compound as in claim 6 wherein $R_1$, $R_4$ and $R_5$ each is lower alkyl and $n$ is 2.
14. A compound as in claim 13 wherein $R_3$ is butylamino, $R_4$ and $R_5$ each is methyl and $R_1$ is ethyl.

* * * * *